US012574846B2

(12) United States Patent
Xu et al.

(10) Patent No.: US 12,574,846 B2
(45) Date of Patent: Mar. 10, 2026

(54) WAKE-UP SIGNAL RECEPTION FOR PAGING OPERATIONS

(71) Applicant: Apple Inc., Cupertino, CA (US)

(72) Inventors: Fangli Xu, Beijing (CN); Chunhai Yao, Beijing (CN); Clive E. Rodgers, Palo Alto, CA (US); Dawei Zhang, Saratoga, CA (US); Haijing Hu, Los Gatos, CA (US); Haitong Sun, Cupertino, CA (US); Longda Xing, San Jose, CA (US); Murtaza A. Shikari, Mountain View, CA (US); Sarma V. Vangala, Campbell, CA (US); Sethuraman Gurumoorthy, San Ramon, CA (US); Srirang A. Lovlekar, Fremont, CA (US); Wei Zeng, Saratoga, CA (US); Yuchul Kim, San Jose, CA (US); Yuqin Chen, Beijing (CN); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 489 days.

(21) Appl. No.: 17/593,451

(22) PCT Filed: Jul. 23, 2020

(86) PCT No.: PCT/CN2020/103863
§ 371 (c)(1),
(2) Date: Sep. 19, 2021

(87) PCT Pub. No.: WO2022/016467
PCT Pub. Date: Jan. 27, 2022

(65) Prior Publication Data
US 2022/0303897 A1 Sep. 22, 2022

(51) Int. Cl.
*G08C 17/00* (2006.01)
*H04W 52/02* (2009.01)
(Continued)

(52) U.S. Cl.
CPC ..... *H04W 52/0229* (2013.01); *H04W 68/005* (2013.01); *H04W 76/28* (2018.02)

(58) Field of Classification Search
CPC ...................... H04W 52/0229; H04W 68/005; H04W 76/28
(Continued)

(56) References Cited

U.S. PATENT DOCUMENTS

2007/0259675 A1* 11/2007 Worrall ................. H04W 68/00
455/458
2008/0182596 A1 7/2008 Wang et al.
(Continued)

FOREIGN PATENT DOCUMENTS

CN 108966322 12/2018
CN 109803373 5/2019
(Continued)

OTHER PUBLICATIONS

Guangdong OPPO Mobile Telecom, "Considerations on the DL power consumption reduction for feNB-IoT", 3GPP TSG RAN WG1 Meeting 89, R1-1707690, May 6, 2017, 3 sheets.
(Continued)

*Primary Examiner* — Temica M Beamer
(74) *Attorney, Agent, or Firm* — Fay Kaplun & Marcin, LLP

(57) ABSTRACT

A user equipment (UE) is configured to utilize wake up signaling during paging operations. The operates in a paging discontinuous reception (DRX) cycle, wherein the paging DRX cycle includes a paging occasion (PO). The UE receives a wake-up signal (WUS) during a WUS occasion
(Continued)

Method 400

Start

405 — Determine a WUS location in time and a PO location in time

410 — Select a beam to utilize for WUS reception

415 — Receive a WUS during the WUS occasion

420 — Determine the contents of the WUS

425 — Operate in accordance with the contents of the WUS during the PO

End that is associated with the PO and selects a mode of operation to utilize during the PO based on the WUS.

20 Claims, 9 Drawing Sheets

(51) Int. Cl.
  *H04W 68/00*        (2009.01)
  *H04W 76/28*        (2018.01)
(58) Field of Classification Search
  USPC .......................................................... 370/311
  See application file for complete search history.

(56)                    References Cited

U.S. PATENT DOCUMENTS

| | | | | | |
|---|---|---|---|---|---|
| 2018/0332533 | A1* | 11/2018 | Bhattad | ............. | H04W 52/0235 |
| 2019/0029000 | A1 | 1/2019 | Vikberg et al. | | |
| 2019/0150094 | A1 | 5/2019 | Liu et al. | | |
| 2019/0254110 | A1 | 8/2019 | He et al. | | |
| 2019/0320490 | A1* | 10/2019 | Liu | ................... | H04W 52/0216 |
| 2019/0342833 | A1* | 11/2019 | Åström | ................... | H04W 8/24 |
| 2019/0349856 | A1 | 11/2019 | Liu et al. | | |
| 2020/0029302 | A1* | 1/2020 | Cox | ................... | H04W 52/0216 |
| 2020/0068526 | A1* | 2/2020 | Ji | .......................... | H04W 52/02 |
| 2020/0092814 | A1* | 3/2020 | Zhou | ................ | H04W 52/0235 |
| 2020/0100179 | A1* | 3/2020 | Zhou | ................ | H04W 52/0216 |
| 2020/0107267 | A1 | 4/2020 | Wu et al. | | |
| 2020/0154355 | A1 | 5/2020 | Nam et al. | | |
| 2020/0163048 | A1* | 5/2020 | Kim | ...................... | H04W 72/12 |
| 2020/0221416 | A1 | 7/2020 | Wong et al. | | |
| 2020/0229095 | A1* | 7/2020 | Shrestha | ................. | H04W 4/70 |
| 2020/0314949 | A1* | 10/2020 | Jung | ..................... | H04W 68/00 |
| 2021/0037465 | A1 | 2/2021 | Mazloum et al. | | |
| 2021/0127335 | A1 | 4/2021 | Rostami et al. | | |
| 2021/0360582 | A1 | 11/2021 | Priyanto et al. | | |
| 2022/0070783 | A1 | 3/2022 | Hsieh et al. | | |
| 2022/0400437 | A1 | 12/2022 | Wei et al. | | |

FOREIGN PATENT DOCUMENTS

| | | |
|---|---|---|
| CN | 109923914 | 6/2019 |
| CN | 110199550 | 9/2019 |
| CN | 110536379 | 12/2019 |
| CN | 110536382 | 12/2019 |
| CN | 110769489 | 2/2020 |
| CN | 111132280 | 5/2020 |
| CN | 111294892 | 6/2020 |
| CN | 111328458 | 6/2020 |
| CN | 111328461 | 6/2020 |
| CN | 111373806 | 7/2020 |
| KR | 20200028822 | 3/2020 |
| WO | 2019/086674 | 5/2019 |
| WO | 2019/095323 | 5/2019 |
| WO | 2019/160496 | 8/2019 |
| WO | 2019/162025 | 8/2019 |
| WO | 2019/213952 | 11/2019 |
| WO | 2019/216808 | 11/2019 |
| WO | 2020/038546 | 2/2020 |
| WO | 2020/060696 | 3/2020 |

OTHER PUBLICATIONS

Sony, "Channels and procedures for adapting UE power consumption characteristics"; 3GPP TSG RAN WG1 Meeting #94bis; R1-1810645; Oct. 12, 2018; 3 sheets.
Sony, "On supporting UE group wake up signal for MTC/NB-IoT", 3GPP TSG-RAN WG2 Meeting #107, R2-1913362, Oct. 4, 2019, 7 sheets.
ZTE Corporation, "Remaining issues on wake-up signal", 3GPP TSG-RAN WG2 Meeting#102, R2-1807667, May 11, 2018, 3 sheets.

* cited by examiner

Method 400

405  Determine a WUS location in time and a PO location in time

410  Select a beam to utilize for WUS reception

415  Receive a WUS during the WUS occasion

420  Determine the contents of the WUS

425  Operate in accordance with the contents of the WUS during the PO

Start

End

WAKE-UP SIGNAL RECEPTION FOR PAGING OPERATIONS

BACKGROUND

A user equipment (UE) may be configured with a paging cycle that includes a scheduled time window during which the UE is to monitor for paging. Outside of the scheduled time window, the UE may have the opportunity to sleep and conserve power. Under conventional circumstances, the UE monitors for paging during the scheduled time window regardless of whether a paging transmission intended for the UE is actually performed by the network. This is an inefficient use of the UE's limited power supply. Accordingly, there is a need for a mechanism that mitigates the inefficient power consumption associated with paging reception at the UE.

SUMMARY

Some exemplary embodiments are related to a method performed by a user equipment (UE) operating in a paging discontinuous reception (DRX) cycle, wherein the paging DRX cycle includes a paging occasion (PO). The method includes receiving a wake-up signal (WUS) during a WUS occasion that is associated with the PO and selecting a mode of operation to utilize during the PO based on the WUS.

Other exemplary embodiments are related to a user equipment having a transceiver and a processor. The transceiver is configured to communicate with a network. The processor is configured to perform operations that include operating in a paging discontinuous reception (DRX) cycle, wherein the DRX cycle includes a paging occasion (PO), receiving a wake-up signal (WUS) during a WUS occasion that is associated with the PO and selecting a mode of operation to utilize during the PO based on the WUS.

Still further exemplary embodiments are related to an integrated circuit. The integrated circuit includes circuitry configured to operate in a paging discontinuous reception (DRX) cycle, wherein the paging DRX cycle includes a paging occasion (PO), circuitry configured to receive a wake-up signal (WUS) during a WUS occasion that is associated with the PO and circuitry configured to select a mode of operation to utilize during the PO based on the WUS.

DETAILED DESCRIPTION

Figure 1:
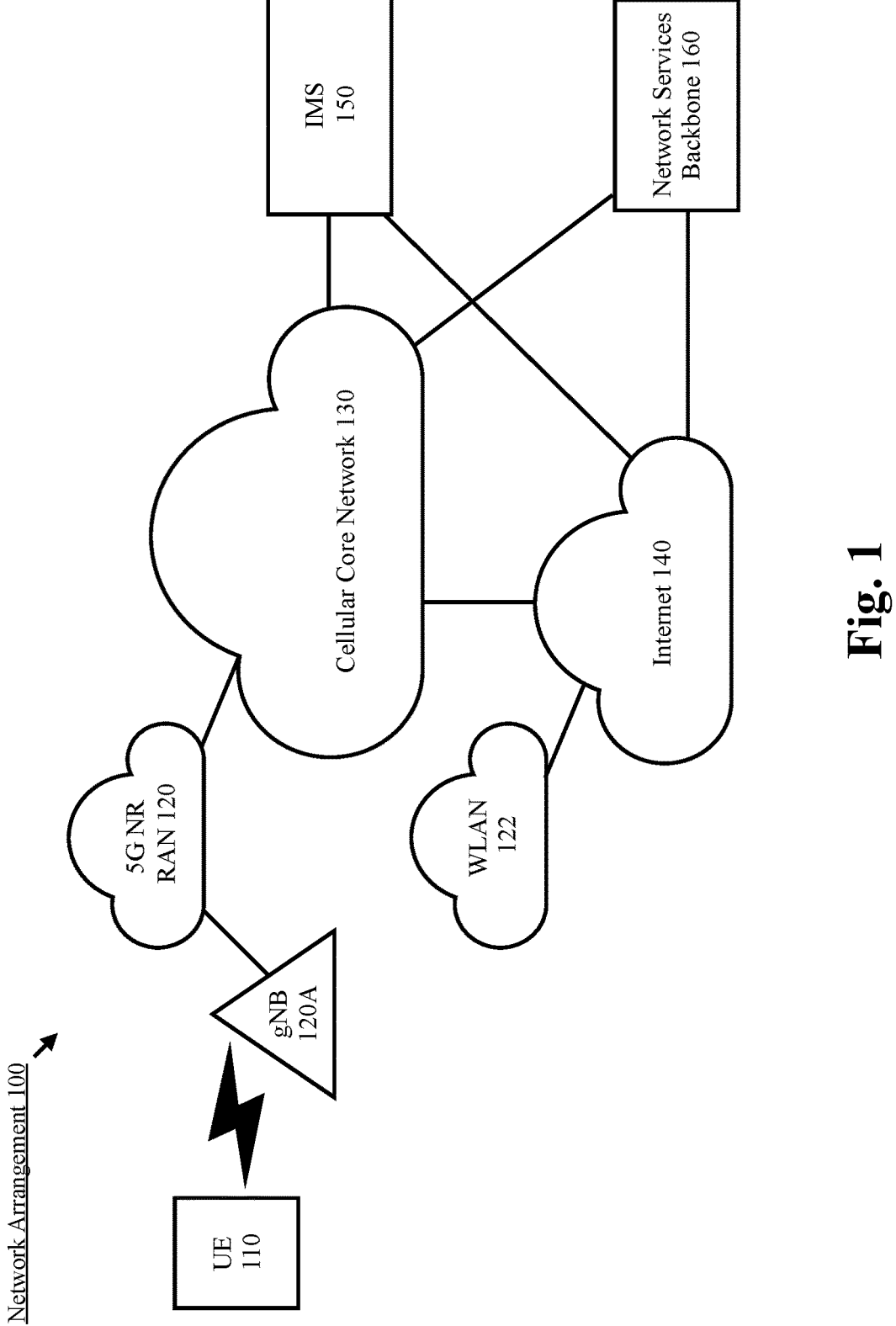
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to using wake-up signaling between a network and a user equipment (UE) in conjunction with a paging mechanism. As will be described in more detail below, the wake-up signaling may allow the UE to mitigate the inefficient power consumption associated with conventional paging techniques.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to the network being a fifth generation (5G) New Radio (NR) network. The 5G NR network and the UE may utilize a paging mechanism that incorporates a wake-up signal (WUS). However, any reference to the 5G NR network, a particular paging mechanism or a WUS are merely provided for illustrative purposes. The exemplary embodiments may apply to any type of network that utilizes wake-up signaling in conjunction with any appropriate type of paging mechanism.

Paging may be used for any of variety of different reasons. For example, when camped on a cell of the 5G NR network, the UE may receive a paging message that is configured to trigger the UE to transition from a radio resource control (RRC) idle state or RRC inactive state to an RRC connected state. In another example, paging may be used by the network to indicate a system information change. In response to this indication, the UE may subsequently acquire the updated system information. In a further example, paging may be used to indicate an emergency message (e.g., a commercial mobile alert system (CMAS) message, an earthquake and tsunami warning system (ETWS) message, etc.). In response to this indication, the UE may subsequently acquire the emergency message. The above examples are not intended to limit the exemplary embodiments in any way and are merely provided to illustrate why the network and the UE may utilize a paging mechanism.

On the network side, a paging transmission may include a paging message and/or a short message. Those skilled in the art will understand that a paging message may be used for the notification of one or more UEs and may be transmitted via a physical downlink shared channel (PDSCH) or any other appropriate type of physical control channel (PCCH). Those skilled in the art will also understand that a short message may be used to provide the UE with a particular type of indication such as a system information modification or an emergency message. The short message may be transmitted on the physical downlink control channel (PDCCH), with or without an associated paging message, using the short message filed in downlink control information (DCI).

On the UE side, paging reception may include monitoring for paging during a scheduled time window. For example, during a discontinues reception (DRX) cycle, the UE may be configured with a paging occasion (PO). The PO may include a one or more time slots during which the UE is configured to listen to a communication channel (e.g., PCCH, PDSCH, PDCCH, etc.) for a paging transmission. The PO may be included in a paging frame (PF). The PF may refer to a radio frame that includes one or more paging occasions. Those skilled in the art will understand how the timing for a PF and PO may be configured.

The DRX cycle is a power saving mechanism that includes utilizing an active mode of data exchange processing and a sleep mode of inactivity. Within the context of paging, the active mode of data exchange processing may refer to the UE performing operations that enable the UE to receive information and/or data broadcast by the network. For example, during a PO, the UE may enter the active mode of data exchange processing to monitor for a paging transmission. Outside of the PO, the UE may have an opportunity to utilize the sleep mode of inactivity and conserve power. Throughout this description, the terms "DRX cycle" and "paging cycle" may be used interchangeably. However, any reference to a DRX cycle or a paging cycle is merely for illustrative purposes, different networks may refer to similar concepts by a different name. The exemplary embodiments may apply to any scenario in which the UE transitions between a power saving mode and an active mode with regard to data exchange processing.

Under conventional circumstances, the UE may wakeup during one or more POs regardless of whether a paging transmission is performed by the network during the PO. However, utilizing an active mode of data exchange processing during a PO that does not include a paging transmission intended for the UE is an inefficient use of the UE's limited power supply. As will be described below, the exemplary embodiments may allow the UE to omit utilizing the active mode of data exchange processing during a PO if there is no paging transmission intended for the UE during the PO.

The exemplary embodiments relate to utilizing wake-up signaling between the UE and the network in conjunction with a paging mechanism. Throughout this description, the term "wake-up signal" or "WUS" may refer to a signal transmitted by the network to the UE that includes information regarding a subsequent time window during which the UE is to monitor for paging (e.g., a PO). The WUS may allow the UE to mitigate the inefficient power consumption associated with conventional paging techniques. For example, the WUS may indicate that a paging transmission is not scheduled for a subsequent PO. During the subsequent PO, the UE may remain in the sleep mode of inactivity instead of waking up to use the active mode of data exchange processing because the WUS indicated that there is no paging transmission scheduled for this PO.

In one aspect, the exemplary embodiments relate to the timing relationship between the WUS and its corresponding PO. As will be described in detail below, there are various exemplary configurations of one or more WUS and one or more PO that may be implemented. In another aspect, the exemplary embodiments relate the types of contents that may be included in the WUS and how the UE may respond to the WUS. The exemplary wake-up signaling may be used in conjunction with currently implemented paging techniques, future implementations of paging techniques or independently from other paging techniques.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120 and a WLAN 122. However, it should be understood that the UE 110 may also communicate with other types of networks (e.g. 5G cloud RAN, LTE-RAN, legacy cellular network, etc.) and the UE 110 may also communicate with networks over a wired connection. With regard to the exemplary embodiments, the UE 110 may establish a connection with the 5G NR RAN 120 and/or the WLAN 122. Therefore, the UE 110 may have a 5G NR chipset to communicate with the NG-RAN 120 and an ISM chipset to communicate with the WLAN 122.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 122 may include any type of wireless local area network (WiFi, Hot Spot, IEEE 802.11x networks, etc.).

The base station (e.g., the gNB 120A) may include one or more communication interfaces to exchange data and/or information with camped UEs, the corresponding RAN, the cellular core network 130, the internet 140, etc. Further, the base station may include a processor configured to perform various operations. For example, the processor of the base station may be configured to perform operations related to paging and the exemplary wake-up signaling described herein. However, reference to a processor is merely for illustrative purposes. The operations of the base station may also be represented as a separate incorporated component of the base station or may be a modular component coupled to the base station, e.g., an integrated circuit with or without firmware. For example, the integrated circuit may include input circuitry to receive signals and processing circuitry to process the signals and other information. In addition, in some base stations, the functionality of the processor is split among two or more processors such as a baseband processor and an applications processor. The exemplary embodiments may be implemented in any of these or other configurations of a base station.

Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell (e.g., the gNB 120A). As mentioned above, the use of the 5G NR RAN 120 is for illustrative purposes and any type of network may be used. For example, the UE 110 may also connect to the LTE-RAN (not pictured) or the legacy RAN (not pictured).

In addition to the networks 120 and 122 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
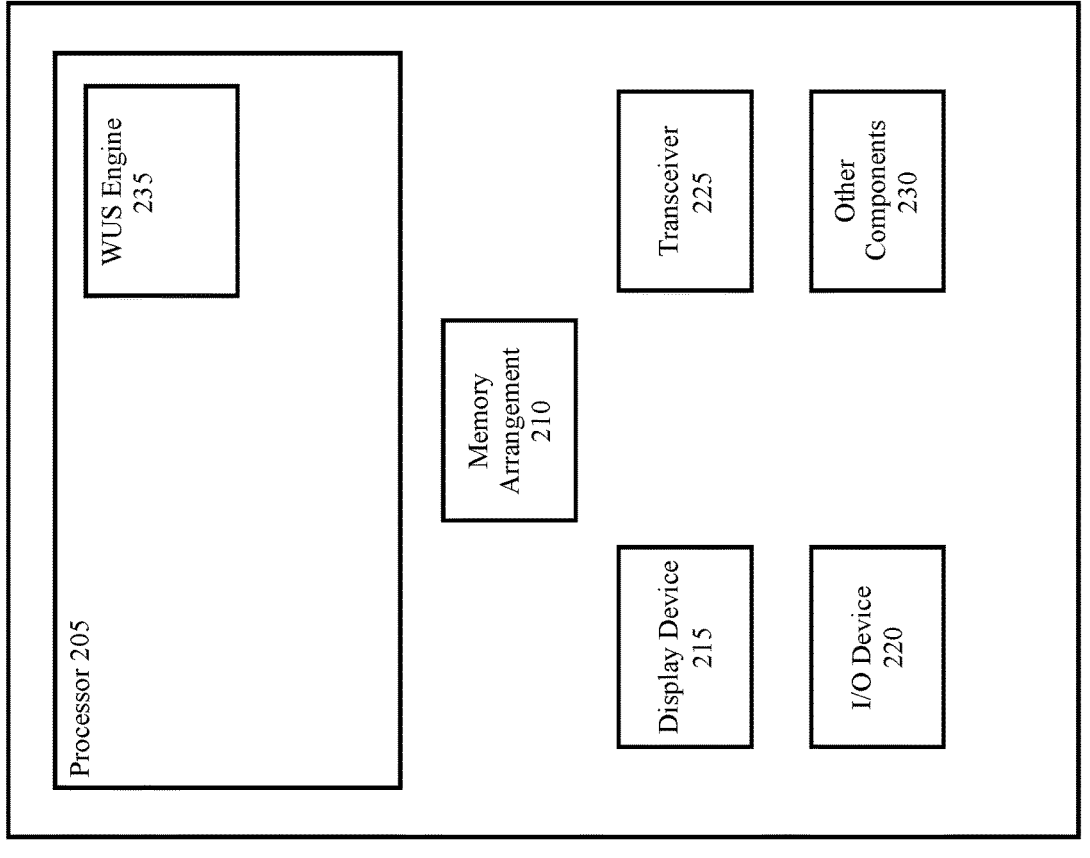
FIG. 2 shows an exemplary user equipment (UE) according to various exemplary embodiments.
Figure 2:

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a WUS engine 235. The WUS engine 235 may be configured to perform operations associated with detecting a WUS and determining the contents of the WUS. The WUS engine 235 may be further configured to control the paging reception behavior of the UE 110 in response to receiving a WUS.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

When connected to the network, the UE 110 may be configured to be in one of a plurality of different operating states. One operating state may be characterized as RRC idle state and another operating state may be characterized as RRC connected state. RRC refers to the radio resource control (RRC) protocols. Those skilled in the art will understand that when the UE 110 is in an RRC connected state, the UE 110 and the network may be configured to exchange information and/or data. The exchange of information and/or data may allow the UE 110 to perform functionalities available via the network connection. Further, those skilled in the art will understand that when the UE 110 is connected to the network and in RRC idle state the UE 110 is generally not exchanging data with the network and radio resources are not being assigned to the UE 110 within the network. However, when the UE 110 is in RRC idle state, the UE 110 may monitor for information and/or data transmitted by the network (e.g., WUS, paging, etc.).

Another operating state may be characterized as RRC inactive state. In RRC inactive state, the UE 110 maintains an RRC connection while minimizing signaling and power consumption. Similar to RRC idle state, when the UE 110 is connected to the network and in RRC inactive state the UE 110 is generally not exchanging data with the network. When the UE 110 is in RRC inactive state, the UE 110 may still monitor for information and/or data transmitted by the network (e.g., WUS, paging, etc.). However, any reference to RRC connected state, RRC idle state and RRC inactive state is merely provided for illustrative purposes, the exemplary embodiments may apply to any suitable operating state for the UE 110.

When the UE 110 is camped on a cell and in an RRC idle state or an RRC inactive state, the UE 110 may not be able to exchange data with the network. To exchange data with the network the UE 110 may transition from the RRC idle state to the RRC connected state. For example, while in RRC idle state or inactive state the UE 110 may listen for information such as but not limited to, primary synchronization signals (PSS) and secondary synchronization signals (SSS), Master Information Block (MIB), broadcast messages, System Information Block (SIB), WUS, paging messages, etc. In response, the UE 110 may issue a request to the network that indicates that the UE 110 wants to be moved to the RRC connected state. A successful transition from the RRC idle state or RRC inactive state to RRC connected state may include the exchange of messages between the UE 110 and the cell of the network. In the RRC connected state, a network context may be established between the cell of first network and the UE 110. Thus, the UE 110 may be assigned radio resources and the UE 110 may be able to exchange data with the network.

When in RRC idle state or RRC inactive state, the UE 110 may be configured with a DRX cycle. As indicated above, the DRX cycle may include a PO during which the UE 110 may monitor for paging. In accordance with legacy operation, the UE 110 may enter the active mode of data exchange processing and monitor a PO regardless of whether a paging transmission is performed by the network during the PO.

The exemplary embodiments reduce the power consumption associated with legacy operations by implementing wake-up signaling that may be used to control UE 110 paging reception behavior.

The exemplary embodiments are also described with regard to a paging mechanism that supports multiple beam operation. For multiple beam operation, the PO may include a set of PDCCH monitoring occasions that each include one or more time slots where downlink control information (DCI) may be transmitted. The length of the PO may correspond to one period of beam sweeping and the UE 110 may assume that a paging message is include in all beams of the beam sweeping pattern. The exemplary embodiments will describe how the wake-up signaling may be used in conjunction with a paging mechanism that supports multiple beam operation.

Figure 3:
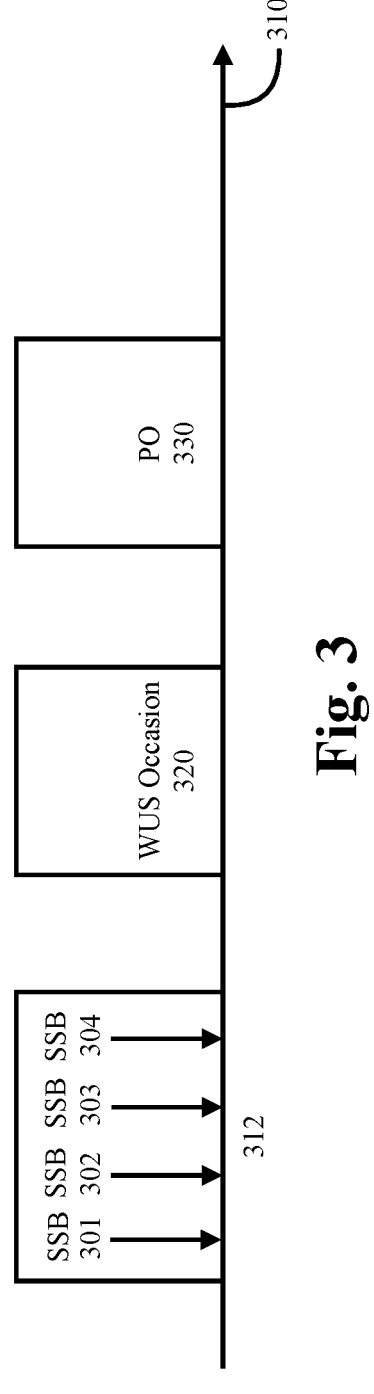
FIG. 3 shows an exemplary timing diagram for a wake-up signal (WUS) occasion according to various exemplary embodiments.

FIG. 3 shows an exemplary timing diagram 300 for a WUS occasion according to various exemplary embodiments. FIG. 3 will be described with regard to the network arrangement 100 of FIG. 1 and the UE 110 of FIG. 2. The timing diagram 300 provides a general overview of how wake-up signaling may be used in conjunction with a paging mechanism. A specific example from the perspective of the UE 110 is provided below with regard to the method 400 of FIG. 4.

The timing diagram 300 includes a line 310 that represents time. Initially, consider a scenario in which the UE 110 is camped on the gNB 120A and operating in an RRC idle state. During a first time duration 312, a synchronization signal blocks (SSB) burst may be transmitted by the gNB 120A. In this example, the SSB burst includes a first SSB 301, a second SSB 302, a third SSB 303 and a fourth SSB 304. In some embodiments, each SSB 301-304 may correspond to a different beam within the beam sweeping pattern. The UE 110 may then select a beam to utilize for WUS and paging reception based on one or more of the SSBs 301-304.

During a second time duration 314, a WUS occasion 320 is scheduled. Similar to the concept of the PO occasion, the UE 110 is configured to monitor for a WUS during the WUS occasion 320.

The network may transmit a WUS during the WUS occasion 320. In some embodiments, downlink control information (DCI) based wake-up signaling may be implemented. In this configuration, the WUS occasion 320 may represent a set of PDCCH monitoring occasions and may include multiple time slots (e.g., subframe or orthogonal frequency division multiplexing (OFDM) symbol) during which the WUS DCI may be transmitted. Within the WUS occasion 320, each monitoring occasion is associated with one of the SSBs 301-304. For multiple beam operation, the UE 110 may assume that the same WUS is repeated in all transmitted beams within the same WUS occasion. The UE 110 may select one of the beams based on any appropriate criteria.

During the WUS occasion 320, the UE 110 may monitor for WUS DCI. The monitoring may be performed based on WUS specific radio network temporary identifier (RNTI), the UE 110 paging RNTI (P-RNTI) or any other appropriate indicator included in the WUS. In response to the WUS DCI, the UE 110 may decide whether to monitor for paging or use the sleep mode of inactivity during the subsequent PO 330.

In other embodiments, reference signal based wake-up signaling may be implemented. In this configuration, the WUS occasion 320 may include multiple time slots during which one or more WUS reference signals may be transmitted. Within the WUS occasion 320, each monitoring occasion is associated with one of the SSBs 301-304. For multiple beam operation, the UE 110 may assume that the same WUS is repeated in all transmitted beams within the same WUS occasion. The UE 110 may select one of the beams based on any appropriate criteria.

During the WUS occasion 320, the UE 110 may monitor for a WUS reference signal. In response to the WUS reference signal, the UE 110 may decide whether to monitor for paging or use the sleep mode of inactivity during the subsequent monitoring occasion 330.

Figure 4:
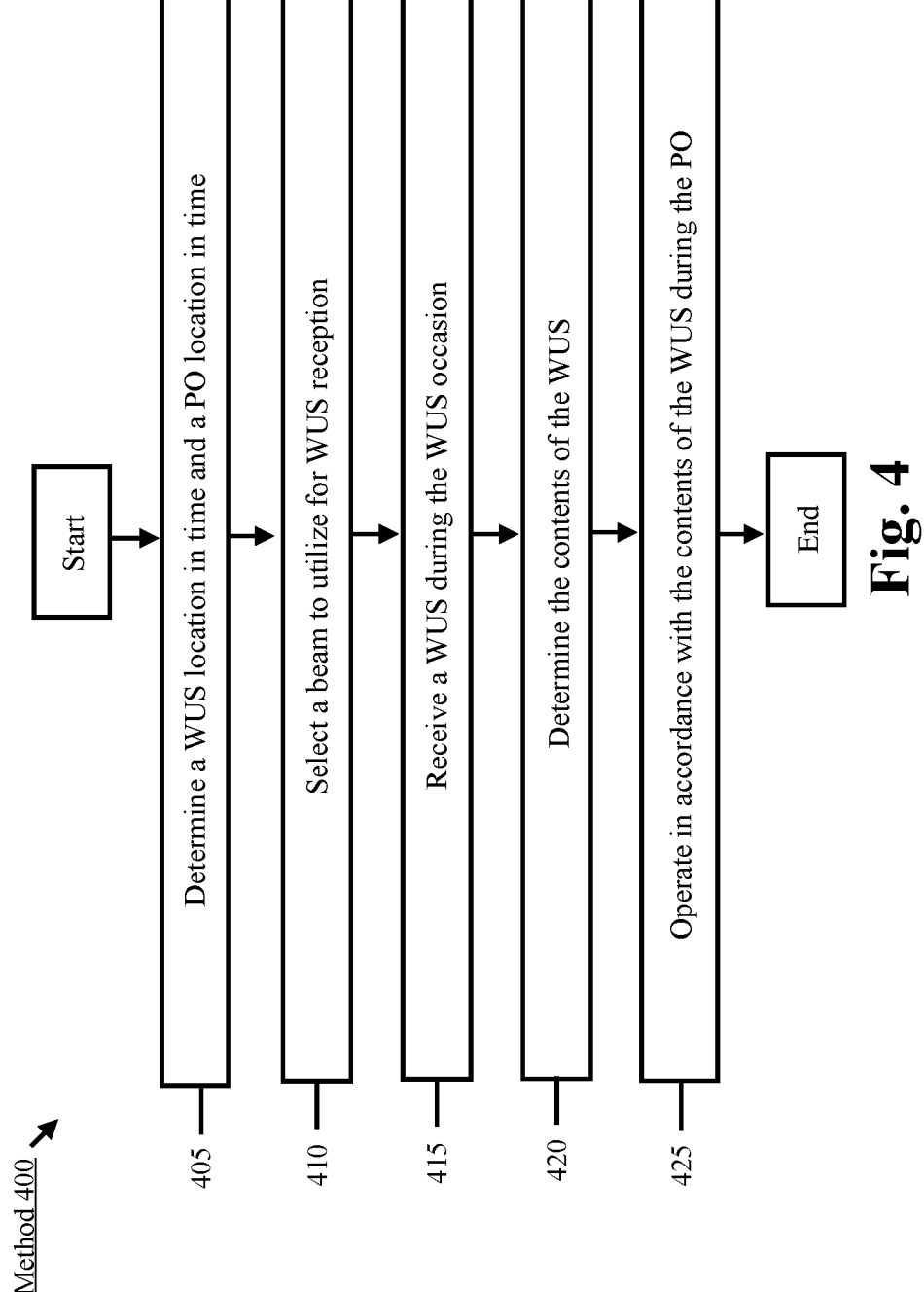
FIG. 4 shows a method for WUS and paging reception according to various exemplary embodiments.

FIG. 4 shows a method 400 for WUS and paging reception according to various exemplary embodiments. FIG. 4 will be described with regard to the network arrangement 100 of FIG. 1 and the UE 110 of FIG. 2.

Initially, consider a scenario in which the UE 110 is camped on the gNB 120A of the 5G NR RAN 120 and operating in an RRC idle state or an RRC inactive state. The UE 110 may be further configured with a DRX cycle that includes one or more POs.

In 405, the UE 110 determines a WUS occasion location in time and a PO location in time. For example, the UE 110 may utilize legacy and/or standards based techniques to determine when a PO is scheduled to occur. In some embodiments, the WUS may be located at a predetermined offset from the PO and thus, once the PO is known the WUS occasion may be derived. In another example, the WUS occasion and/or PO location may be explicitly or implicitly indicated by the network using any appropriate type of signaling. Specific examples of the relationship between the WUS occasion and the PO will be described below with regard to FIGS. 5-9.

In 410, the UE 110 selects a beam to utilize for WUS reception. For instance, within the context of the timing diagram 300, the UE 110 may receive the SSBs 301-304. As mentioned above, each of the SSBs 301-304 may correspond to a different beam. The UE 110 may then select a beam based on one or more of the SSBs 301-304. The above example is merely provided for illustrative purposes, the UE 110 may select a beam to utilize for WUS reception based on any appropriate basis.

In 415, the UE 110 receives a WUS during the WUS occasion. As mentioned above, either DCI based wake-up signaling or reference signal based wake-up signaling may be implemented. Although not depicted in the method 400, there may be scenarios in which the UE 110 does not receive a WUS during the WUS occasion. If this scenario occurs, in some embodiments, the UE 110 may monitor for paging in the conventional manner. In other embodiments, the network may configure a default state (e.g., wake-up or sleep) that the UE 110 is to utilize during the PO via RRC signaling or any other appropriate type of signaling.

In 420, the UE 110 determines the contents of the WUS. For example, the WUS may indicate that a paging transmission intended for the UE 110 is to be performed during the corresponding PO. In another example, the WUS may indicate that a paging transmission is not scheduled for the UE 110. As will be explained in more detail below, the WUS may also include more specific information regarding the corresponding PO and/or paging transmission.

In 425, the UE 110 may operate in accordance with the contents of the WUS during the corresponding PO. For example, if the WUS received in 420 indicated that a paging transmission intended for the UE 110 is to be performed during the PO, the UE 110 may wake-up and enter the active mode of data exchange processing during the PO to monitor for the paging transmission. In some embodiments, the WUS may indicate to the UE 110 only paging DCI is to be monitored for short message reception. In other embodiments, the WUS may indicate to the UE 110 that both paging DCI and the PDSCH are to be monitored.

To provide another example, if the WUS received in 420 indicated that a paging transmission is not scheduled for the PO, the UE 110 may use the sleep mode of inactivity and conserve power during the PO. Thus, the WUS may control the paging reception behavior of the UE 110.

The WUS may also be used to include more specific information regarding the upcoming PO and/or paging transmission. In some embodiments, the WUS may be configured to include an indication of the purpose of the upcoming paging transmission, e.g., system information update/modification, ETWS/CMAS indication, paging message, etc. This indication may provide the basis for how the UE 110 operates during the PO. To provide an example, if the WUS indicates that the upcoming PO is to be used for paging message transmission, the UE 110 may monitor the PDCCH using P-RNTI to detect the scheduled paging message during the PO. To provide another example, if the WUS indicates that the corresponding PO is to be used for a paging transmission indicating a system information update or an emergency message, the UE 110 may use the sleep mode of inactivity during the PO. Since the UE 110 is already aware of what the paging transmission is going to indicate, it would be redundant to receive this indication during the PO. Instead, the UE 110 may conserve power during the PO and perform the normal operations for system information update or emergency message reception.

In some embodiments, the WUS may be configured to include information such as a service type, an access type, a paging type and/or network slicing information. This information may provide the basis for how the UE 110 operates during the PO. To provide an example, the WUS content may indicate that the corresponding paging transmission is related to non-third generation partnership program (non-3GPP) access. If the UE 110 does not support non-3GPP access, the UE 110 does not need to monitor the PO because a paging transmission corresponding to non-3GPP access is irrelevant to the UE 110. In another example, the WUS content may indicate that the corresponding paging transmission is related to voice services. If the UE 110 is not configured for voice services or does not intend to access voice services at this time, the UE 110 does not need to monitor the PO because a paging transmission corresponding to voice services is irrelevant to the UE 110. Those skilled in the art will understand that this technique may be applicable to any other network service type.

In a further example, the WUS content may indicate that the paging type is RAN initiated. Since RAN initiated paging type is relevant to RRC inactive state, the UE 110 may monitor the PO if the UE 110 is operating in RRC inactive state and not monitor the PO if the UE 110 is operating in RRC idle state. Alternatively, the WUS content may indicate that the paging type is core network initiated. Since core network initiated paging type is relevant to RRC idle state, the UE 110 may monitor the PO if the UE 110 is operating in RRC idle state and not monitor the PO if the UE 110 is operating in RRC inactive state.

In another example, the WUS content may indicate that the paging transmission is associated with a particular network slice. If the UE 110 is configured to support the relevant slicing ID or network slice selection assistance information (NSSAI), the UE 110 may monitor for paging during the PO. Otherwise, the UE 110 may sleep during the PO. The above examples are not intended to limit the exemplary embodiments in any way and are merely provide for illustrative purposes. The UE 110 may use information such as service type, access type, paging type and/or network slicing information in any appropriate manner to determine whether to utilize the active mode of data exchange processing during the PO or the sleep mode of inactivity during the PO.

In some embodiments, the WUS may be configured to include UE information. This information may provide the basis for how the UE 110 operates during the PO. For example, the WUS may include the full UE ID for the UE that is the intended recipient of the paging transmission. If the UE ID is relevant to the UE 110, the UE 110 may monitor the PO. Otherwise, the UE 110 may use the sleep mode of inactivity during the PO. In another example, the WUS may include a partial UE ID (e.g., (n) least significant bits (LSBs) of the UE ID) for the UE that is the intended recipient of the paging transmission. If the partial UE ID is relevant to the UE 110, the UE 110 may monitor the PO. Otherwise, the UE 110 may use the sleep mode of inactivity during the PO. In a further example, the WUS may include a WUS group ID. In some embodiments, the UE 110 may be provisioned with the WUS group ID via non-access stratum (NAS) signaling or RRC signaling. In other embodiments, the UE 110 may generate a WUS group ID using predefined rule. Regardless of how the UE 110 derives the WUS group ID, If the WUS group ID is relevant to the UE 110, the UE 110 may monitor the PO. Otherwise, the UE 110 may use the sleep mode of inactivity during the PO.

The method 400 demonstrated how the contents of the WUS may be used to control the paging reception behavior of the UE 110. The following FIGS. 5-9 are provided to demonstrate the different ways in which one or more WUS occasions may be associated with one or more POs.

Figure 5:
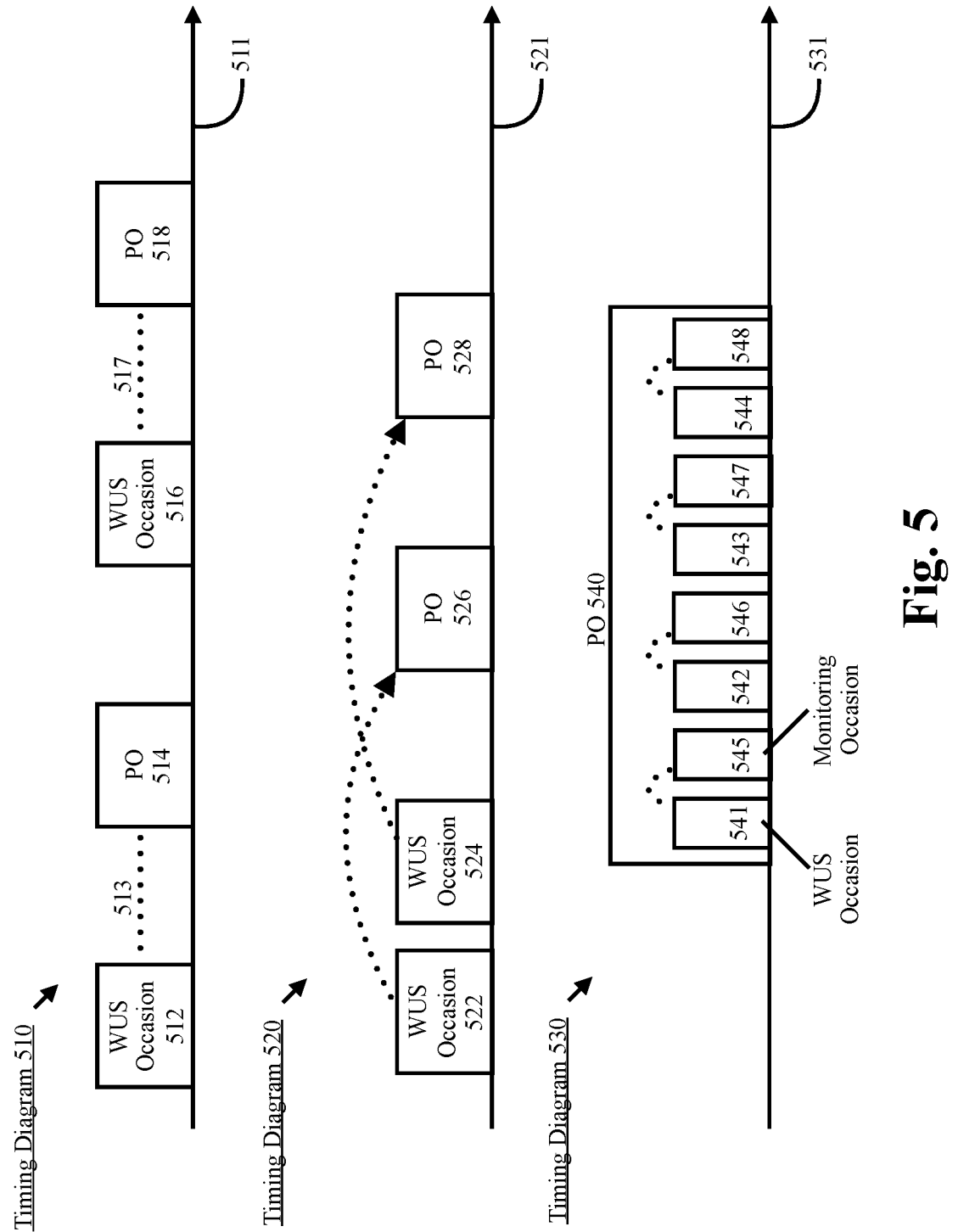
FIG. 5 illustrates examples of the relationship between a WUS occasion and a paging occasion (PO) when one WUS is configured to control one PO for one paging group according to various exemplary embodiments.

FIG. 5 illustrates examples of the relationship between a WUS occasion and a PO when one WUS is configured to control one PO for one paging group according to various exemplary embodiments. FIG. 5 includes three timing diagrams 510, 520, 530 that each correspond to a different configuration.

In some embodiments, the WUS occasion may be located a preconfigured offset from the PO. The timing diagram 510 includes a line 511 that represents time. The timing diagram also shows a WUS occasion 512 preceding its corresponding PO 514 by a preconfigured offset 513 and WUS occasion 516 preceding its corresponding PO 518 by the preconfigured offset 517.

In some embodiments, for each PF or paging DRX cycle, all WUSs are transmitted before all POs. The timing diagram 520 includes a line 521 that represents a time duration of a single PF. The timing diagram also shows a WUS occasions 522, 524 preceding their corresponding POs 526, 528, respectively.

In some embodiments, a WUS channel is located before its corresponding monitoring occasion for the same beam. The timing diagram 530 includes a line 531 that represents time. The timing diagram 530 includes a PO 540 and within the PO 540 shows four WUS occasions 541-544 each preceding their respective monitoring occasion 545-548.

To utilize the configurations shown in the timing diagrams 510-530, the UE 110 may initially determine PO location using legacy techniques. In some embodiments, the WUS occasion may be associated with the corresponding PO according to RRC configuration. In other embodiments, the WUS occasion is the closest WUS occasion in front of the correspond PO. To provide an example, the WUS occasion 512 is associated with the PO 514 and the WUS occasion 516 is associated with the PO 516 in the timing diagram. As mentioned above with regard to the method 400, the WUS received during the WUS occasion may be used to control UE 110 paging reception behavior, e.g., active mode of data exchange processing during the PO or sleep mode of inactivity during the PO.

Figure 6:
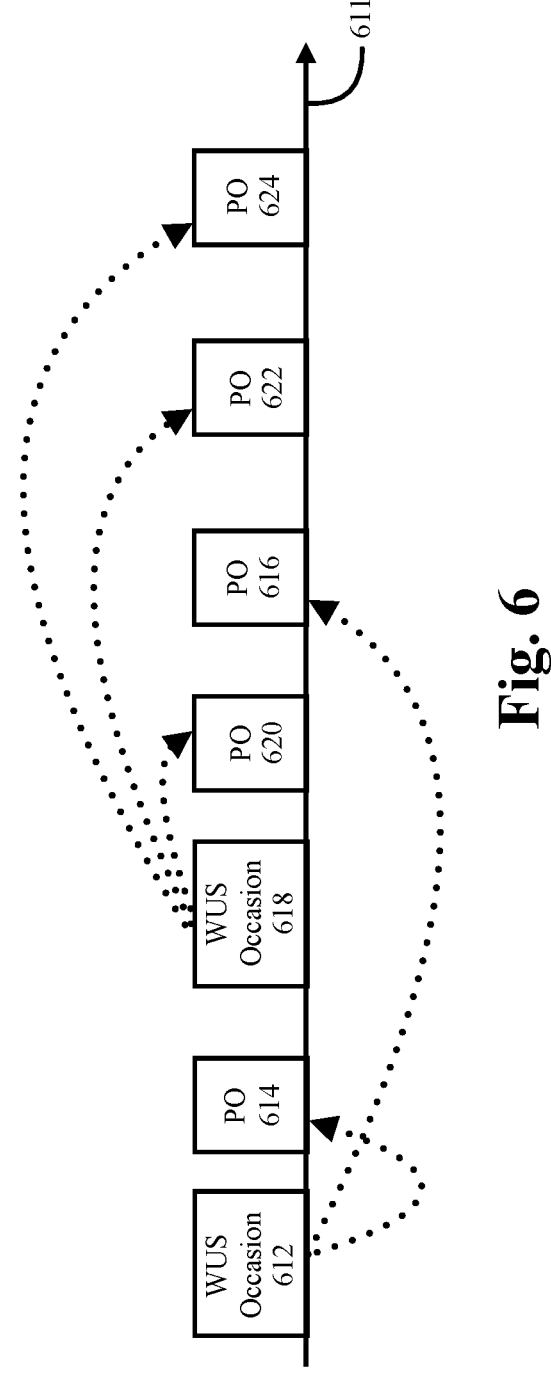
FIG. 6 illustrates examples of the relationship between a WUS occasion and a PO when one WUS is configured to control multiple POs for one paging group according to various exemplary embodiments.

FIG. 6 illustrates examples of the relationship between a WUS occasion and a PO when one WUS is configured to control multiple POs for one paging group according to various exemplary embodiments. FIG. 6 includes a timing diagram 610.

In some embodiments, a WUS occasion may be associated with (N) POs. The timing diagram 610 shows a line 611 that represents time. In this example, a first WUS occasion 612 is associated with two POs 614-616 and WUS occasion 618 is associated with three POs 620-624. The number of POs (N) and the identity of the POs may be configured by RRC signaling or indicated with the WUS.

To utilize the configuration shown in the timing diagram 610, the UE 110 may initially determine its PO locations and WUS occasion location. If the WUS indicates that the UE 110 is to wake-up for paging monitoring, the UE 110 may wakeup and enter the active mode of data exchange processing to monitor the N POs. If the WUS indicates that the UE 110 is to sleep, the UE 110 will sleep and not monitor the N POs. Within the N POs, the UE 110 will not monitor WUS occasions. After N consecutive POs, the UE 110 will resume monitoring WUS occasions.

Figure 7:
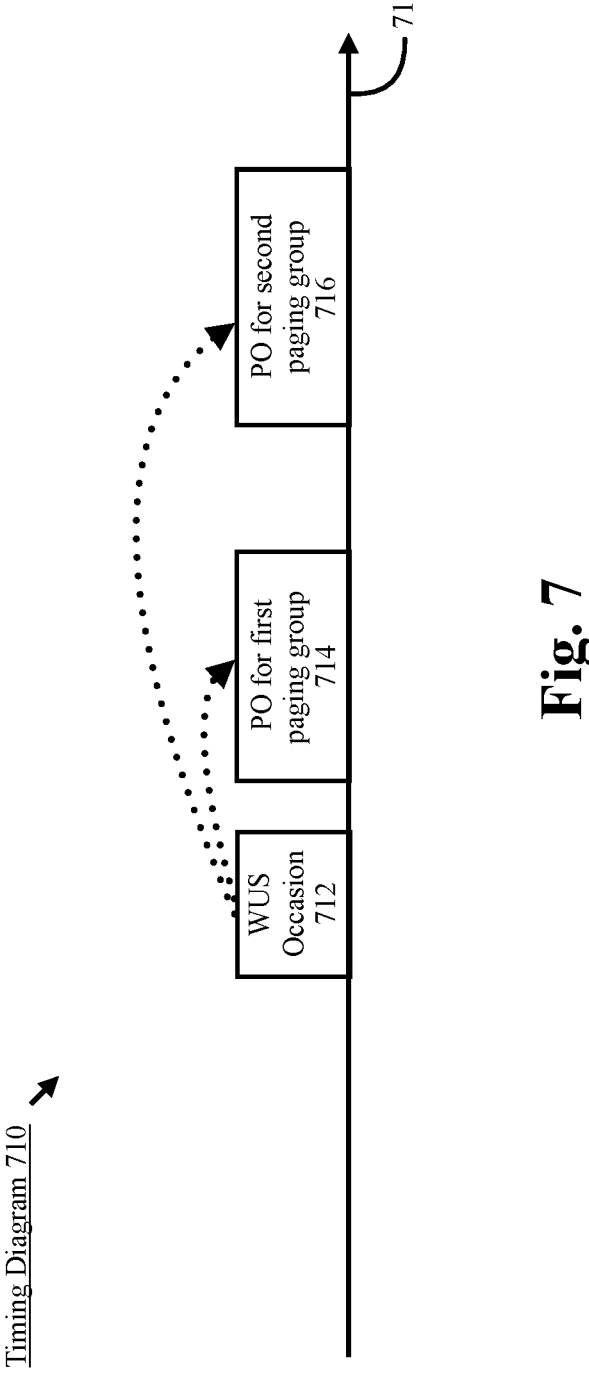
FIG. 7 illustrates examples of the relationship between a WUS occasion and a PO when one WUS is configured to control one PO for multiple paging groups according to various exemplary embodiments.

FIG. 7 illustrates examples of the relationship between a WUS occasion and a PO when one WUS is configured to control one PO for multiple paging groups according to various exemplary embodiments. FIG. 7 includes a timing diagram 710.

In some embodiments, a WUS may be used to indicate a wake-up/sleep state for multiple paging groups. The timing diagram 710 includes a line 711 that represents time. In this example, the WUS occasion 712 is shown to include a WUS that is associated with PO 714 and PO 716. The PO 714 is assigned to a first paging group and the PO 716 is assigned to a second different paging group. However, reference to two paging groups is merely provided for illustrative purposes, this configuration may be used for any appropriate one to (N) paging groups mapping.

To utilize the configuration shown in the timing diagram 710, the UE 110 may initially determine its PO location and WUS occasion location. In some embodiments, the WUS may indicate a common wake-up/sleep state for multiple paging groups. Thus, if the WUS includes a wake-up indication the UEs of both paging groups will wake-up and enter the active mode of data exchange processing during their respective POs. In other embodiments, the WUS may indicate individual wake-up/sleep state for each paging group. For example, the WUS may include a set of bits. A first subset of one or more bits may be used to indicate whether a first paging group is to wake-up or sleep during its corresponding PO and a second subset of one or more bits may be used to indicate whether a second paging group is to wake-up or sleep during its corresponding PO.

Figure 8:
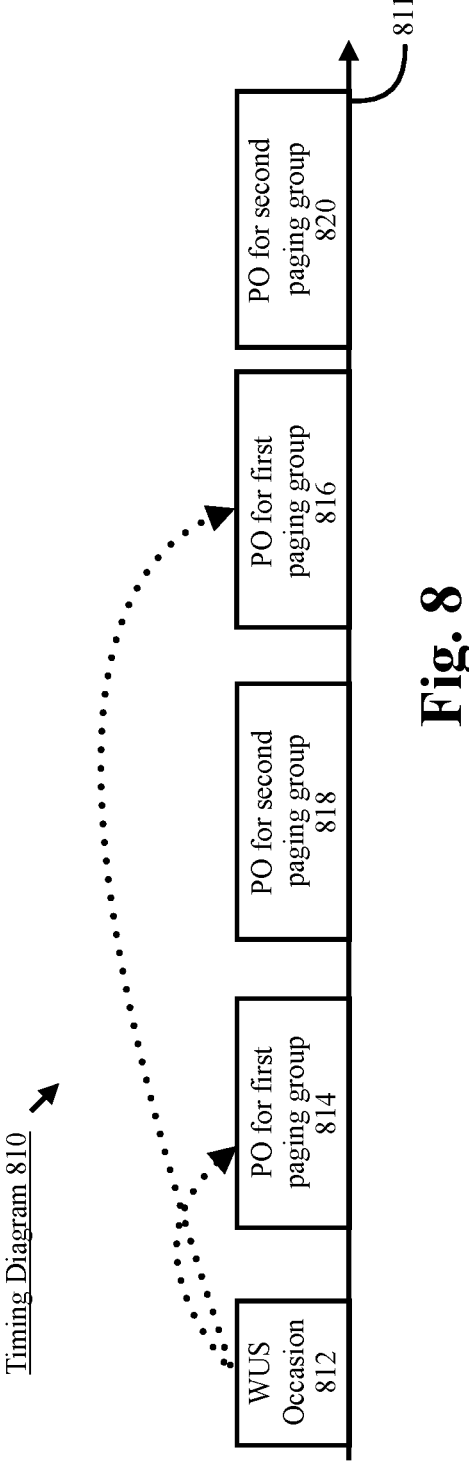
FIG. 8 illustrates examples of the relationship between a WUS occasion and a PO when one WUS is configured to control multiple POs for multiple paging groups according to various exemplary embodiments.

FIG. 8 illustrates examples of the relationship between a WUS occasion and a PO when one WUS is configured to control multiple POs for multiple paging groups according to various exemplary embodiments. FIG. 8 includes a timing diagram 810.

The timing diagram 810 includes a line 811 that represents time. The WUS occasion 812 may correspond to (N) paging groups and (x) consecutive POs for each paging groups. The timing diagram 810 shows POs 814, 816 that correspond to a first paging group and POs 818, 820 that correspond to a second paging group.

In this example, the UE 110 is in the first paging group. Thus, the UE 110 may operate in accordance with the WUS during POs 814, 816 (e.g., (x) consecutive POs). Similar to the examples shown in FIG. 6, within the (x) consecutive paging group POs, the UE 110 will not monitor WUS occasions. After the (x) consecutive POs, the UE 110 will resume monitoring WUS occasions.

The UEs of the second paging group may operate in accordance with the contents of the WUS. Similar to the example shown in FIG. 7, in some embodiments, the WUS may indicate a common wake-up/sleep state for multiple paging groups. Thus, if the WUS includes a wake-up indication the UEs of both paging groups will wake-up and enter the active mode of data exchange processing during their respective POs. In other embodiments, the WUS may indicate individual wake-up/sleep state for each paging group. For example, the WUS may include a set of bits. A first subset of one or more bits may be used to indicate whether a first paging group is to wake-up or sleep during its corresponding PO and a second subset of one or more bits may be used to indicate whether a second paging group is to wake-up or sleep during its corresponding PO.

Figure 9:
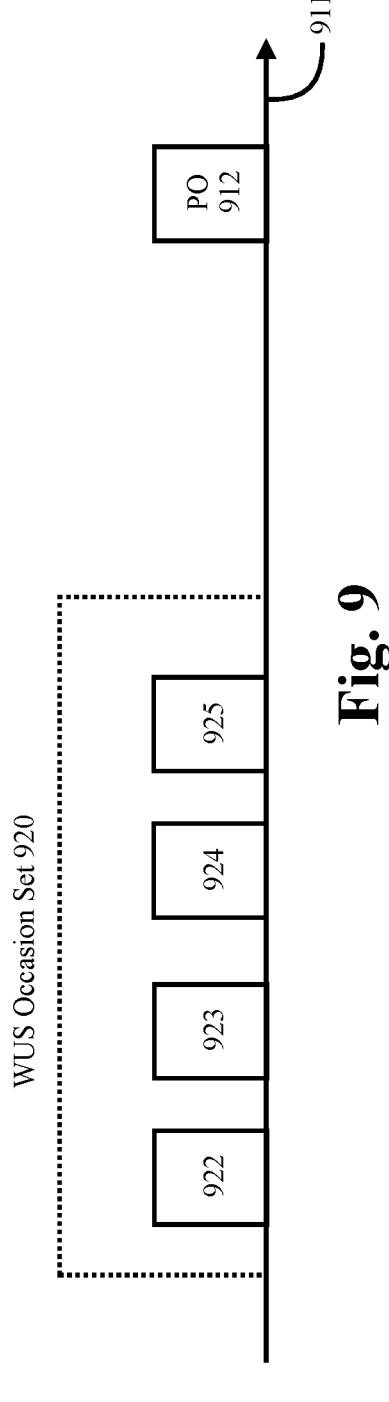
FIG. 9 illustrates examples of the relationship between a WUS occasion and a PO when multiple WUS occasions are configured to control one PO according to various exemplary embodiments.

FIG. 9 illustrates examples of the relationship between a WUS occasion and a PO when multiple WUS occasions are configured to control one PO according to various exemplary embodiments. FIG. 9 includes a timing diagram 910.

The timing diagram 910 includes a line 911 that represents time. In this example, the PO 912 is associated with a WUS occasion set 920 that includes multiple WUS occasions 922-925.

During operation, the UE 110 may determine its PO location using legacy techniques. The UE 110 may then determine the WUS occasion set 920 location. Within the WUS occasion set 920, the UE 110 may find its WUS occasion based on its UE ID (e.g., 5G S-temporary mobile subscriber identity (TMSI) or any other appropriate UE ID). The WUS occasion index may be set to equal to UE ID mod N. For example, if there are four WUS occasions in the WUS occasion set, the LSB 2 bits of the UE ID is the WUS occasion index within the associated WUS occasion set.

To provide an example, consider a scenario in which eight UEs are in the same paging group and configured to use the WUS occasion set 920 and the PO 912. In this example, WUS occasion 922 is assigned to UE1 and UE5, WUS occasion 923 is assigned to UE 2 and UE 6, WUS occasion 924 is assigned to UE 3 and UE 7 and WUS occasion 925 is assigned to UE 4 and UE 8. If WUS occasion 922 indicates wake-up UE 1 and UE 5 will monitor for paging during PO 912, if WUS occasion 923 indicates sleep UE 2 and UE 6 will sleep during the PO 912, if WUS occasion 924 indicates wake-up UE 3 and UE 7 will monitor for paging during PO 912 and if WUS occasion 925 indicates sleep UE 4 and UE 8 will sleep during the PO 912.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a user equipment (UE) operating in a paging discontinuous reception (DRX) cycle, wherein the paging DRX cycle includes a paging occasion (PO):
determining a location in time for a wake-up signal (WUS) occasion, wherein the location in time of the WUS occasion is determined based on a preconfigured offset and a location in time of the PO;
receiving a WUS during the WUS occasion that is associated with the PO, wherein the WUS occasion is assigned to a group of multiple UEs that includes the UE; and
selecting a mode of operation to utilize during the PO based on the WUS, wherein the WUS indicates that the UE is to utilize an active mode during the PO when the WUS includes an identifier and the UE is to utilize a sleep mode during the PO when the WUS does not include the identifier, wherein the identifier is based on a UE ID for the UE.

2. The method of claim 1, further comprising:
identifying that the WUS indicates that a paging transmission intended for the UE is to be transmitted during the PO; and
executing an active mode of processing during the PO to monitor for the paging transmission.

3. The method of claim 2, wherein the WUS further indicates that only paging downlink control information (DCI) is to be monitored during the PO.

4. The method of claim 1, further comprising:
identifying that the WUS indicates that a paging transmission is not to be transmitted to the UE during the WUS occasion; and
executing a sleep mode during the PO.

5. The method of claim 1, further comprising:
identifying that the WUS indicates that a paging transmission for an emergency message is to be performed during the PO; and
executing a sleep mode during the PO based on the indication.

6. The method of claim 1, wherein the WUS indicates an access type corresponding to a paging message that is to be transmitted during the PO.

7. The method of claim 1, wherein the WUS indicates a paging type corresponding to a paging message that is to be transmitted during the PO, wherein the paging type is one of radio access network (RAN) initiated paging or core network initiated paging.

8. The method of claim 1, wherein the WUS includes network slicing information corresponding to a paging message that is to be transmitted during the PO.

9. A user equipment (UE), comprising:
a transceiver configured to communicate with a network; and
a processor configured to perform operations, the operations comprising:
operating in a paging discontinuous reception (DRX) cycle, wherein the DRX cycle includes a paging occasion (PO);
determining a location in time for a wake-up signal (WUS) occasion, wherein the location in time of the WUS occasion is determined based on a preconfigured offset and a location in time of the PO;
receiving a WUS during the WUS occasion that is associated with the PO, wherein the WUS occasion is assigned to a group of multiple UEs that includes the UE; and
selecting a mode of operation to utilize during the PO based on the WUS, wherein the WUS indicates that the UE is to utilize an active mode during the PO when the WUS includes an identifier and the UE is to utilize a sleep mode during the PO when the WUS does not include the identifier, wherein the identifier is based on a UE ID for the UE.

10. The UE of claim 9, the operations further comprising:
identifying that the WUS indicates that a paging transmission intended for the UE is to be transmitted during the PO; and
executing an active mode of processing during the PO to monitor for the paging transmission.

11. The UE of claim 10, wherein the WUS further indicates that both paging downlink control information (DCI) and a physical downlink shared channel is to be monitored during the PO.

12. The UE of claim 9, the operations further comprising:
identifying that the WUS indicates that a paging transmission is not to be transmitted to the UE during the WUS occasion; and
executing a sleep mode during the PO.

13. The UE of claim 9, the operations further comprising:
identifying that the WUS indicates that a paging transmission for an emergency message is to be performed during the PO; and
executing a sleep mode during the PO based on the indication.

14. The UE of claim 9, wherein the WUS indicates a paging type corresponding to a paging message that is to be transmitted during the PO, wherein the paging type is one of radio access network (RAN) initiated paging or core network initiated paging.

15. An integrated circuit, comprising
circuitry configured to operate in a paging discontinuous reception (DRX) cycle, wherein the paging DRX cycle includes a paging occasion (PO);
circuitry configured to determine a location in time for a wake-up signal (WUS) occasion, wherein the location in time of the WUS occasion is determined based on a preconfigured offset and a location in time of the PO;

circuitry configured to receive a WUS during the WUS occasion that is associated with the PO, wherein the WUS occasion is assigned to a group of multiple UEs that includes the UE; and circuitry configured to select a mode of operation to utilize during the PO based on the WUS, wherein the WUS indicates that the UE is to utilize an active mode during the PO when the WUS includes an identifier and the UE is to utilize a sleep mode during the PO when the WUS does not include the identifier, wherein the identifier is based on a UE ID for the UE.

16. The integrated circuit of claim 15, further comprising:

circuitry configured to identify that the WUS indicates that a paging transmission intended for the UE is to be transmitted during the PO; and circuitry configured to execute an active mode of processing during the PO to monitor for the paging transmission.

17. The integrated circuit of claim 16, wherein the WUS further indicates that both paging downlink control information (DCI) and a physical downlink shared channel is to be monitored during the PO.

18. The integrated circuit of claim 15, further comprising:

circuitry configured to identify that the WUS indicates that a paging transmission is not to be transmitted to the UE during the WUS occasion; and circuitry configured to execute a sleep mode during the PO.

19. The integrated circuit of claim 15, further comprising:

circuitry configured to identify that the WUS indicates that a paging transmission for an emergency message is to be performed during the PO; and circuitry configured to execute a sleep mode during the PO based on the indication.

20. The method of claim 1, wherein the UE ID is a 5G S-temporary mobile subscriber identity (TMSI) and the UE ID is based on the UE ID mod N.

* * * * *